(12) United States Patent
Cern

(10) Patent No.: US 6,809,633 B2
(45) Date of Patent: Oct. 26, 2004

(54) COUPLING BROADBAND MODEMS TO POWER LINES

(75) Inventor: Yehuda Cern, Brookline, MA (US)

(73) Assignee: Ambient Corporation, Newton, MA (US)

( * ) Notice: Subject to any disclaimer, the term of this patent is extended or adjusted under 35 U.S.C. 154(b) by 0 days.

(21) Appl. No.: 10/082,063

(22) Filed: Feb. 25, 2002

(65) Prior Publication Data

US 2002/0171535 A1 Nov. 21, 2002

Related U.S. Application Data

(60) Provisional application No. 60/279,939, filed on Mar. 29, 2001.

(51) Int. Cl.$^7$ ............................................. H04M 11/04
(52) U.S. Cl. .......................... 340/310.07; 340/310.06; 340/310.01; 340/310.08; 340/10.05; 340/318; 375/258; 375/259
(58) Field of Search ....................... 340/310.07, 310.06, 340/310.01, 310.08, 310.05, 318; 375/258, 259

(56) References Cited

U.S. PATENT DOCUMENTS

| | | | |
|---|---|---|---|
| 4,004,110 A | 1/1977 | Whyte | 179/170 |
| 4,016,429 A | 4/1977 | Vercellotti et al. | 307/149 |
| 4,142,178 A | 2/1979 | Whyte et al. | 340/310 |
| 4,188,619 A | 2/1980 | Perkins | 340/310 |
| 4,194,128 A | 3/1980 | Biglin | 307/3 |
| 4,254,402 A | 3/1981 | Perkins | 340/310 |
| 4,323,882 A | 4/1982 | Gajjar | 340/310 |
| 4,408,186 A | 10/1983 | Howell | 340/310 |
| 4,433,284 A | 2/1984 | Perkins | 323/361 |
| 4,473,816 A | 9/1984 | Perkins | 340/310 |
| 4,481,501 A | 11/1984 | Dawson | 340/310 |
| 4,504,705 A | 3/1985 | Pilloud | 179/2.51 |
| 4,602,240 A | 7/1986 | Perkins et al. | 340/310 |
| 4,675,648 A | 6/1987 | Roth et al. | 340/310 |
| 4,745,391 A | 5/1988 | Gajjar | 340/310 |
| 4,903,006 A | 2/1990 | Boomgaard | 340/310 |
| 5,257,006 A | 10/1993 | Graham et al. | 340/310 |
| 5,351,272 A | 9/1994 | Abraham | 375/38 |
| 5,406,249 A | 4/1995 | Pettus | 340/310.06 |
| 5,497,142 A * | 3/1996 | Chaffanjon | 340/310.06 |
| 5,559,377 A | 9/1996 | Abraham | 307/104 |
| 5,644,286 A * | 7/1997 | Brosh et al. | 340/310.01 |
| 5,684,450 A | 11/1997 | Brown | 340/310.02 |
| 5,694,108 A | 12/1997 | Shuey | 340/310.01 |
| 5,717,685 A | 2/1998 | Abraham | 370/30 |
| 5,777,769 A | 7/1998 | Coutinho | 359/173 |
| 5,796,604 A * | 8/1998 | Le Van Suu | 700/3 |
| 5,856,776 A | 1/1999 | Armstrong et al. | 340/310.01 |
| 5,864,284 A | 1/1999 | Sanderson | 340/310.01 |
| 5,933,073 A | 8/1999 | Shuey | 340/310.07 |

FOREIGN PATENT DOCUMENTS

WO    WO 92/16920    1/1992

* cited by examiner

*Primary Examiner*—Daniel J. Wu
*Assistant Examiner*—Tai T. Nguyen
(74) *Attorney, Agent, or Firm*—Ohlandt, Greeley, Ruggiero & Perle, LLP (57) ABSTRACT

A method and system are given for a coupling a data signal over a power distribution system. An inductive signal coupler has two windings. The first winding is in series with a line conductor of the power distribution system. A capacitor is connected between the first line conductor and a second line conductor of the distribution system such that the capacitor presents a high impedance to a power signal and a low impedance to a data signal. A communication device is connected to the second winding so that a data signal can be coupled between the communication device and the distribution system.

26 Claims, 13 Drawing Sheets

COUPLING BROADBAND MODEMS TO POWER LINES

This application claims priority from provisional patent application No. 60/279,939, filed Mar. 29, 2001.

FIELD OF THE INVENTION

The present invention relates to coupling communication signals to electrical power distribution systems.

BACKGROUND ART

Communications signals can be coupled to electrical power distribution systems with various devices including broadband powerline modems. Many broadband powerline modems use spread spectrum modulation techniques, such as Orthogonal Frequency Division Multiplex (OFDM) or Direct Sequence Spread Spectrum (DSSS). For data rates of multi-megabits per second, such modems use a frequency band within the range of 1–50 MHz. One advantage of spread spectrum modulation is the ability to connect modems despite resonances and narrow band noise that may make certain segments of the frequency band unusable. But, it is still desirable to reduce the number of such unusable frequency segments and thereby increase the data rate and lower the error rate.

The signal output of a spread spectrum modem needs to be efficiently coupled to a power distribution line. Typically, this occurs at a point where such lines converge such as at the secondary terminals of a distribution transformer (DT) or a nearby junction point. However, the impedance at this coupling point, known as the drive point impedance, may vary widely from very low impedances over some frequency bands to very high impedances over other frequency bands. Relatively simple coupling techniques are likely to be reasonably efficient over some frequency bands, but may introduce significant coupling loss attenuation over other frequency bands.

Figure 1A:
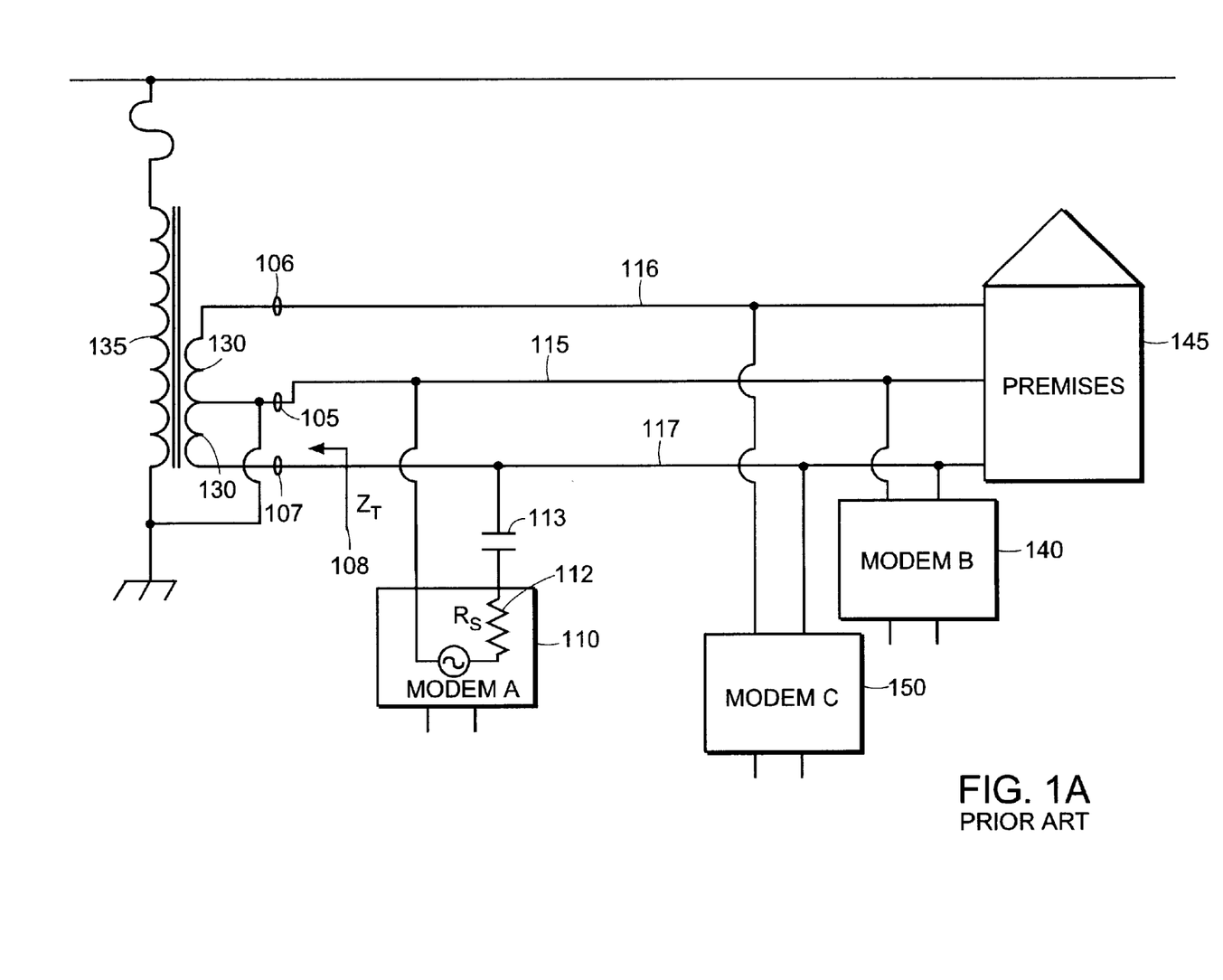
FIGS. 1A and 1B show shunt capacitive coupling of a modem to a power distribution system according to the prior art.
Figure 1B:
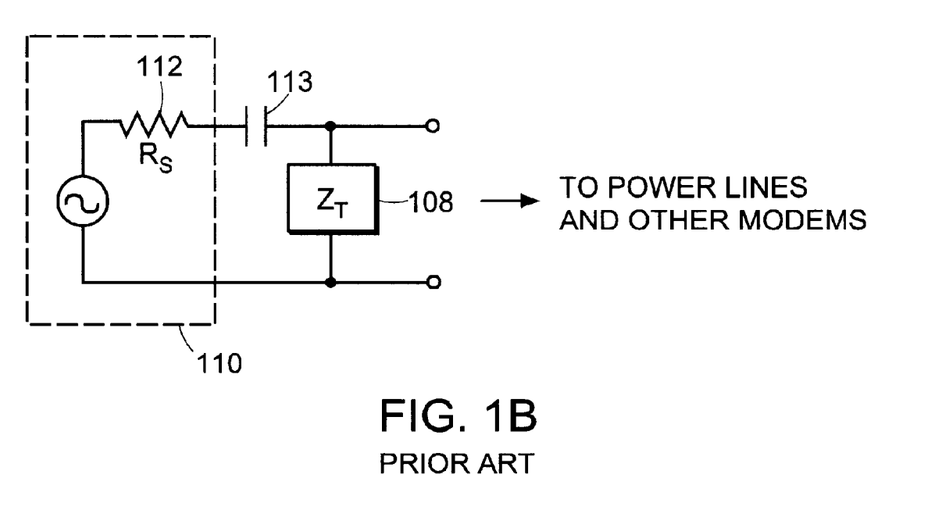

Shunt coupling is one commonly used technique in which the modem is directly coupled across the power line by a series blocking capacitor. FIGS. 1A and 1B show shunt capacitive coupling of a modem to a power distribution system according to the prior art. The power distribution system includes a distribution transformer 135 with a secondary winding 130 having an impedance $Z_T$ 108. Modem A 110 provides a wideband high frequency current connected via a blocking capacitor 113 across power lines 115 and 117. Modem A 110 has an internal resistance $R_S$ 112.

In FIG. 1B, for frequency bands in which $|Z_T| \ll R_S$, $Z_T$ 108 heavily loads the output of Modem A 110 resulting in substantial coupling loss. Even if Modem A 110 had a low output impedance, it would suffer coupling attenuation when the impedance $Z_T$ 108 is much lower than a reflected load impedance $Z_{Lrefl}$ (not shown). In such a case, most of the induced current from modem A 110 would flow through the lower magnitude $Z_T$ 108, and only a smaller portion would flow through $Z_{Lrefl}$ towards Modem B 140. Thus, shunt capacitive coupling is inefficient for widely varying drive point impedances and for very low impedances.

SUMMARY OF THE INVENTION

Representative embodiments of the present invention include methods and corresponding systems for coupling a data signal over a power distribution system based on series inductance mode coupling with a shunt capacitor. An inductive signal coupler has two windings. The first winding is in series with a line conductor of the power distribution system. A capacitor is connected between the first line conductor and a second line conductor of the distribution system such that the capacitor presents a high impedance to a power signal and a low impedance to a data signal. A communication device is connected to the second winding so that a data signal can be coupled between the communication device and the distribution system.

In further embodiments, the line conductor may be a neutral conductor. The communication device may be a spread-spectrum modem. The inductive signal coupler may include a split magnetic core clamped over the line conductor, such that the second winding is wound over the core and a portion of the line conductor within the core acts as the first winding. The first winding may be adjacent to a secondary winding of the transformer within a distance equivalent to $\frac{1}{10}$ wavelength of a highest used frequency of the data signal. This positioning is close enough so as to put the coupler essentially at the terminals of the transformer's secondary winding.

Representative embodiments of the present invention also include methods and corresponding systems for coupling a data signal over a power distribution system based on series inductance mode and parallel capacitance mode couplers. A series inductance coupler is connected to a first line conductor of a power distribution system. A shunt capacitive coupler is connected between the first line conductor and a second line conductor. A communication device has parallel first and second interfaces, the first interface being connected to one coupler and the second interface being connected to the other coupler, to enable coupling of a data signal between the communication device and the power distribution system.

In further embodiments, the line conductor may be a neutral conductor. The communication device may be a spread-spectrum modem. The inductive signal coupler may include a split magnetic core clamped over the line conductor, such that the second winding is wound over the core and a portion of the line conductor within the core acts as the first winding. The first winding may be adjacent to a secondary winding of the transformer, i.e., within $\frac{1}{10}$ wavelength of a highest used frequency of the data signal.

Representative embodiments of the present invention also include methods and corresponding systems for coupling a data signal across a low impedance node of a power distribution system. A capacitor is connected in parallel with a low impedance node of a power distribution system, and presents a high impedance to a power signal and a low impedance to a data signal. A first inductive coupler is connected in series with a line conductor, upstream of the node. A second inductive coupler is connected in series with the line conductor, downstream of the node. The first inductive coupler and the second inductive coupler are operably connected to couple the data signal across the node.

In a further embodiment, a signal amplifier operably connects the first inductive coupler and the second inductive coupler. Alternatively or in addition, a data router may operably connect the first inductive coupler and the second inductive coupler to selectively route a data signal between the first inductive coupler and the second inductive coupler. In that case, the second inductive coupler may be one of a plurality of inductive couplers downstream of the node, so that the data router selectively routes data signals between the first inductive coupler and the plurality of inductive couplers.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Representative embodiments of the present invention utilize techniques for improved series inductance coupling of broadband communications signals to power distribution systems. One specific approach to series inductance coupling in the context of medium voltage (MV) distribution networks is described in commonly assigned U.S. patent application Ser. No. 09/752,705, filed Dec. 28, 2000, and incorporated herein by reference. In contrast to shunt capacitive coupling, series inductive coupling can obviate signal attenuation due to a loading of the distribution transformer impedance on the modem's impedance.

Figure 1C:
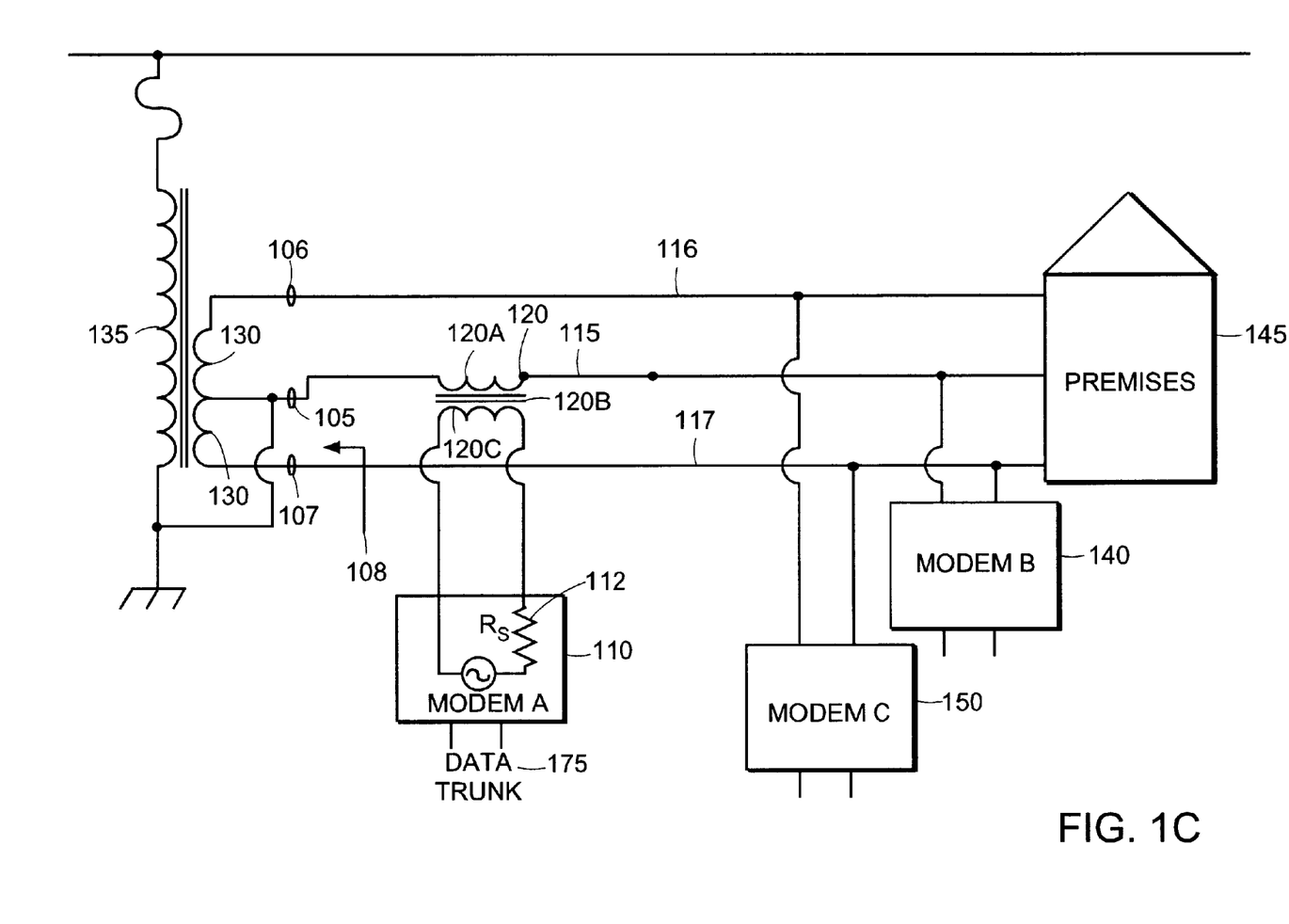
FIGS. 1C and 1D show series inductive coupling of a modem to a power distribution system according to one embodiment of the invention.
Figure 1D:
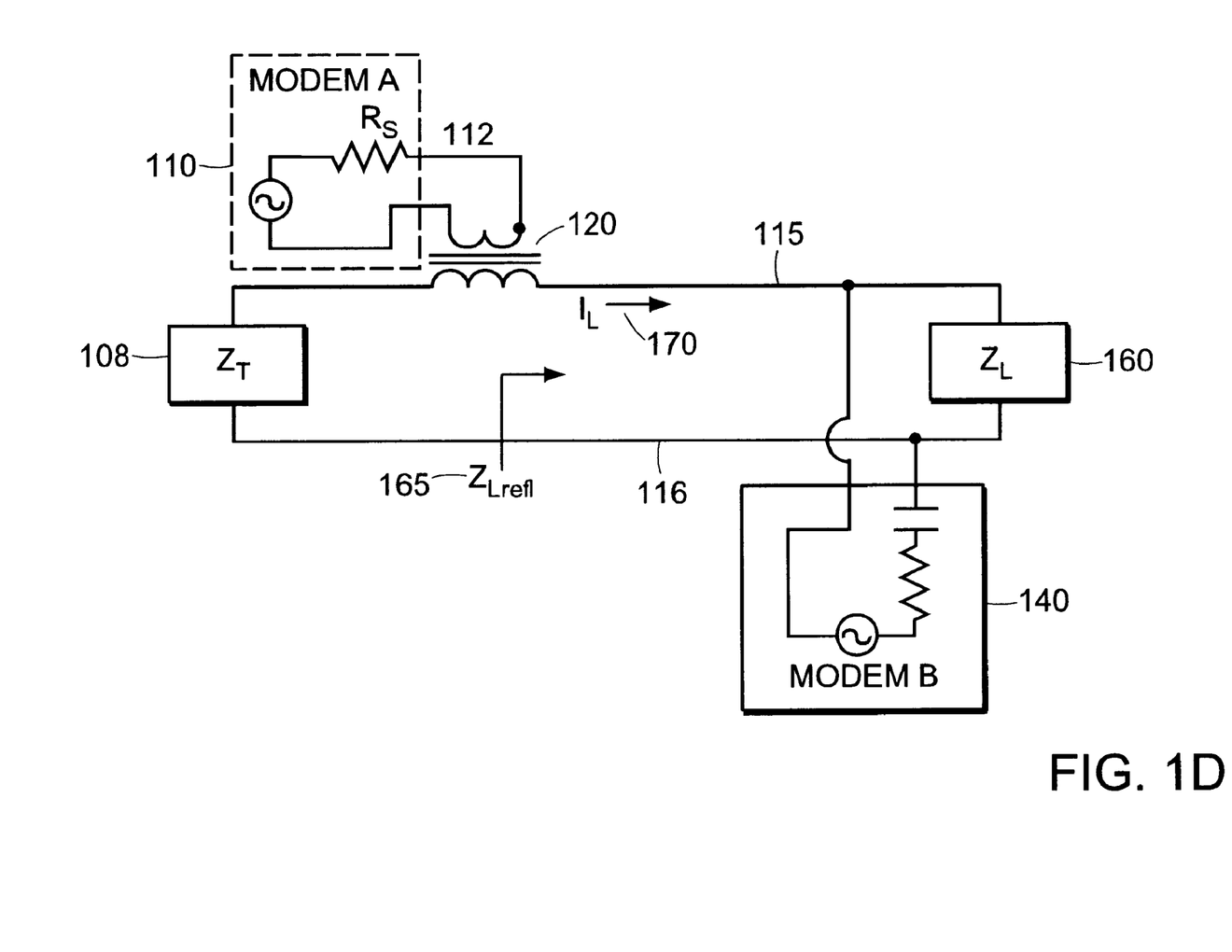

FIG. 1C is a schematic of an improved series inductance coupler according to one embodiment of the present invention, and FIG. 1D shows an equivalent circuit. An inductive coupler 120 effects a series connection in a neutral line 115 of a low voltage power circuit near a distribution transformer (DT) 135. Coupler 120 is located adjacent to a secondary winding 130 of distribution transformer 135, preferably within 1/10 wavelength of the highest used frequency of the signal to be coupled to neutral line 115 by coupler 120.

From FIG. 1D, it can be seen that low values of $|Z_T|$ 108 will facilitate current flow in the circuit including Modem A 110 coupled through coupler 120, transformer secondary impedance $Z_T$ 108, power lines 115 and 116, and a parallel combination of a load impedance $Z_L$ 160 and Modem B 140. The circuit in FIG. 1D also includes a reflected load impedance $Z_{Lrefl}$ 165, which represents a high frequency load impedance reflected through the power lines back to a drive point.

Series inductance coupling works particularly well when the secondary impedance $Z_T$ 108 is uniformly low across the frequency band of interest. However, a high impedance $Z_T$ 108 significantly increases the total impedance of the series combination of $Z_T$ 108 and reflected load impedance $Z_{Lrefl}$ 165, and therefore reduces the amount of modem current $I_L$ 170 coupled into the power line. Thus, series inductance coupling can be efficient for moderate to low drive point impedances, but may be relatively inefficient for very high drive point impedances.

Figure 1E:
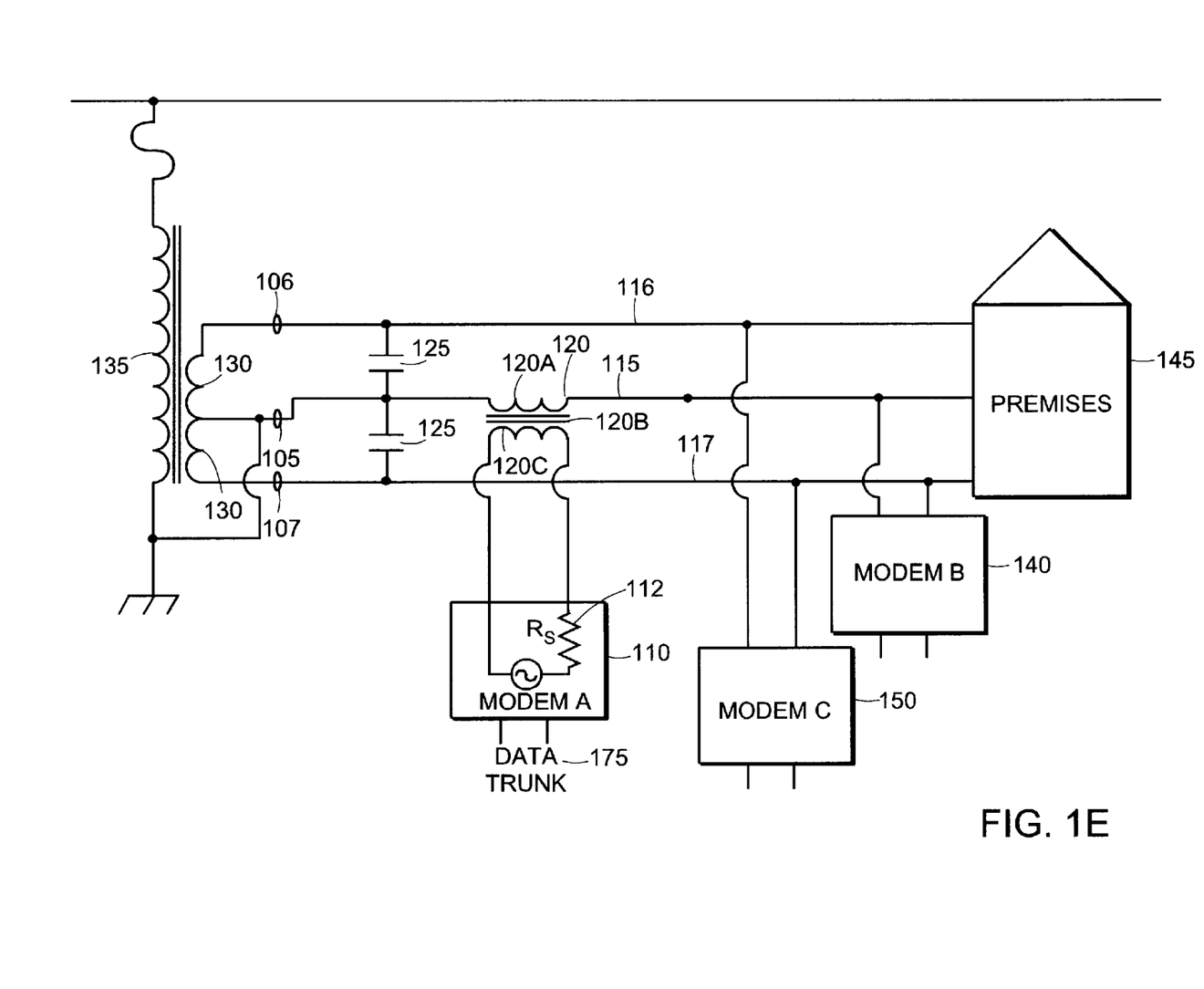
FIGS. 1E and 1F show series inductive coupling with the addition of shunt capacitors according to one embodiment of the invention.
Figure 1F:
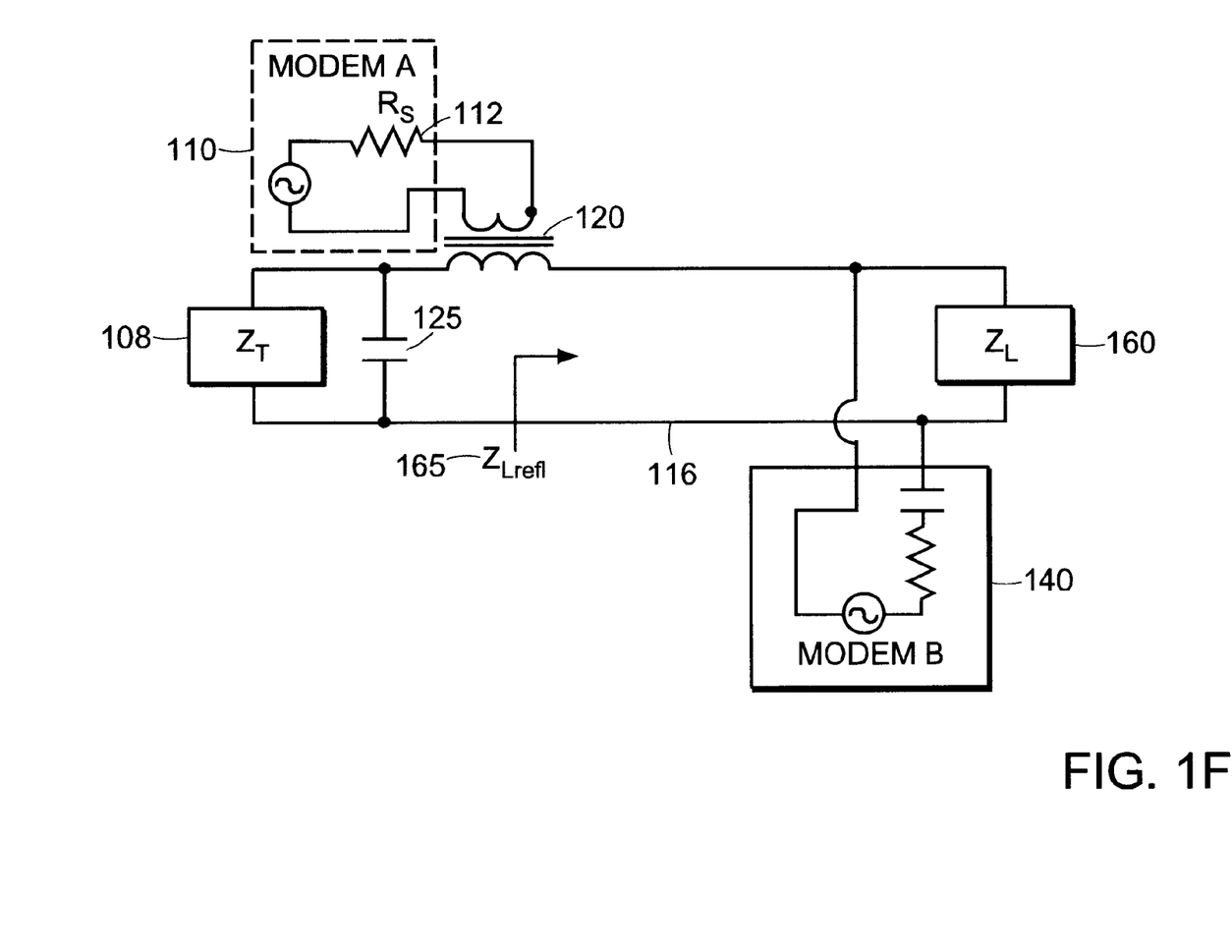

FIG. 1E and equivalent circuit FIG. 1F show one embodiment that maintains a higher coupling efficiency than the basic series inductance mode coupling shown in FIGS. 1C and 1D, even for frequency bands for which $|Z_T|$ 108 is high. In FIG. 1E there are one or more capacitors 125 placed in parallel with secondary 130 of transformer 135. As shown in FIG. 1F, capacitor 125 is thus in parallel with $Z_T$ 108. This parallel combination provides a resultant impedance which is lower than that of $Z_T$ 108 alone. Hence, the current coupled from Modem A 110 is substantially independent of $Z_T$ 108. Coupler 120 is a series inductive coupler that includes an enclosed portion of an existing power line 120A, which functions as a one turn winding, a split magnetic core 120B placed around line 120A, and a second winding 120C wound on core 120B.

When a capacitor 125 is connected across the secondary winding of a distribution transformer, it lowers the resultant impedance across the transformer's terminals over the modem's frequency band, yet capacitor 125 effectively acts as an open circuit at power distribution frequencies. For example, the impedance of a 10 nF capacitor is less than 16 ohms above 1 MHz and less than 1.6 ohms above 10 MHz, while exceeding 250 kilo-ohms at 60 Hz.

Figure 2:
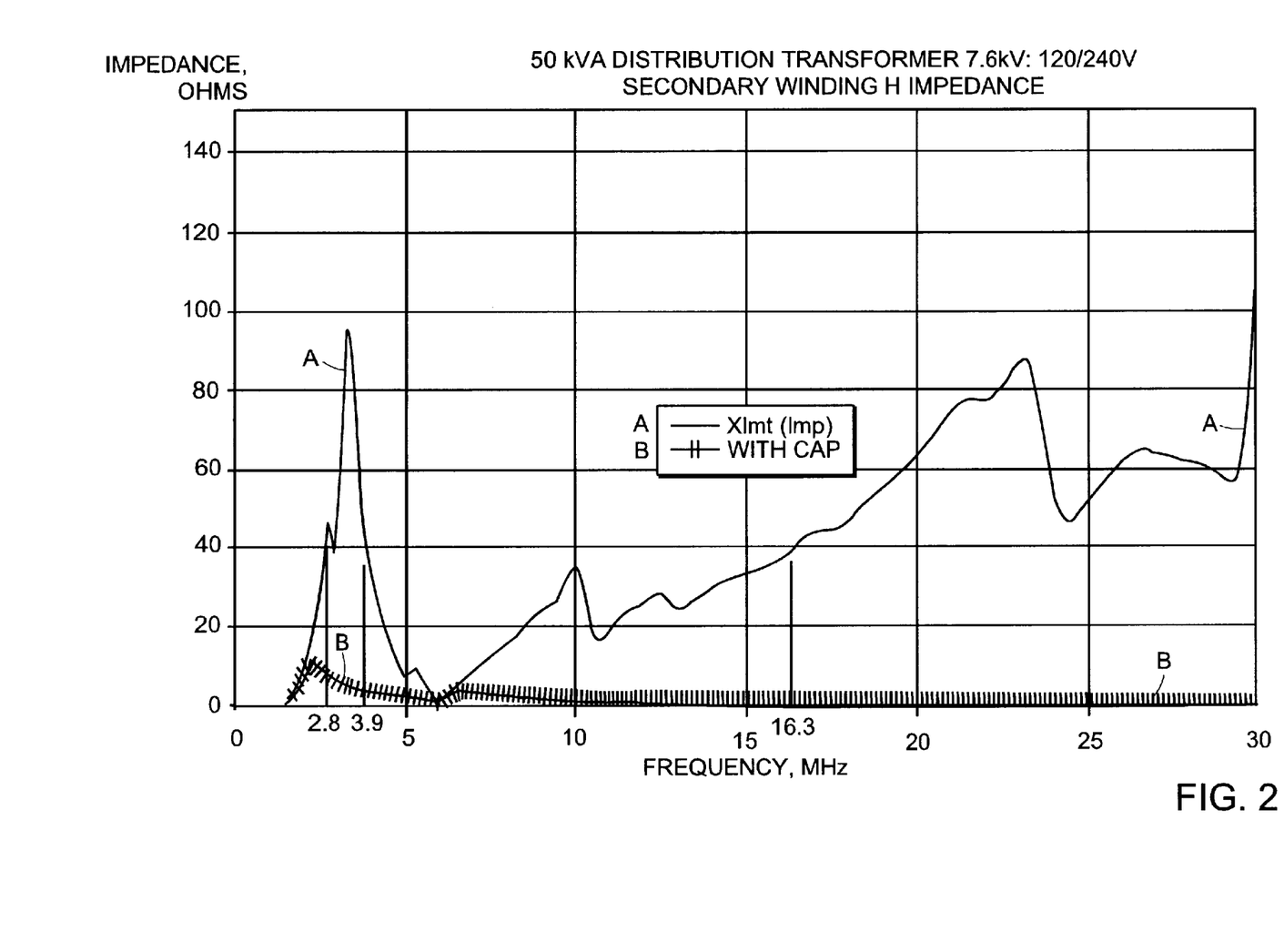
FIG. 2 is graph showing impedance as a function of frequency at the secondary of a typical power distribution transformer.

FIG. 2 is a graph showing impedance as a function of frequency at the secondary of a typical distribution transformer. Curve A represents the impedance without a capacitor, and Curve B represents the resultant impedance when a 10 nF capacitor is placed in parallel with the secondary. Curve A shows that without a parallel capacitor, over frequency bands of 2.8–3.9 MHz and 16.3–30 MHz, the impedance exceeds 40 ohms. This is possibly due to parallel resonances in the transformer winding or leads. Curve B, on the other hand, shows that when the DT secondary is shunted by a 10 nF capacitor, the combined parallel impedance is below 10 ohms for all frequencies.

Embodiments of the present invention are applicable both to single phase power circuits and to multi-phase power circuit in either a wye ("Y") or delta configuration. For two-phase power lines (shown in FIG. 1E), or for three-phase Y-connected power lines, coupler 120 is preferably placed over neutral line 115. In this arrangement, phase lines 116 and 117 are RF return lines between which return currents are approximately evenly divided. Thus, modems at premises 145, connected between one of phase lines 116 or 117 and neutral line 115, are likely to see similar signal levels. This is in contrast to placing coupler 120 over one phase line, and allowing the other phase line(s) to obtain their respective signal(s) only via induction along the cable to the load. Placement of inductive coupler 120 over neutral line 115 also minimizes core saturation effects by reducing the power frequency current level; that is, current in the coupler core 120B provided by the power distribution system.

Figure 1G:
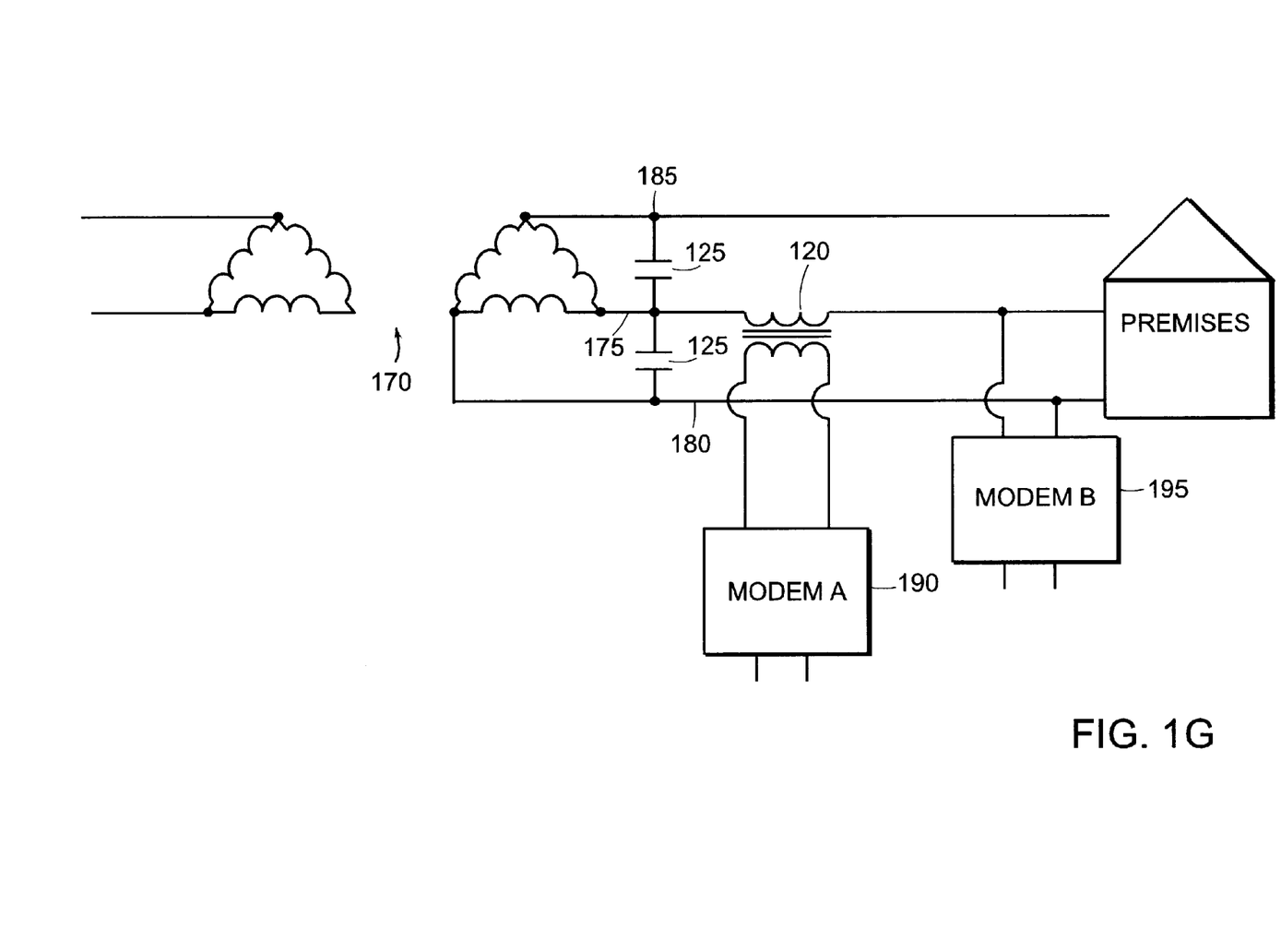
FIG. 1G shows an embodiment for series inductive coupling of a delta-connected three-phase power distribution transformer.

FIG. 1G shows a delta-connected three-phase power transformer 170 and three phase lines 175, 180 and 185. Coupler 120 is placed over one of the three phase lines, for example, line 175, with the remaining phase lines 180 and 185 providing a signal return path. This arrangement helps balance the amplitudes of the return currents. As shown, one or more capacitors 125 are added across the secondary of transformer 170 to ensure a low impedance path for the current for frequency bands over which the impedance of the secondary of transformer 170 is high.

Figure 3A:
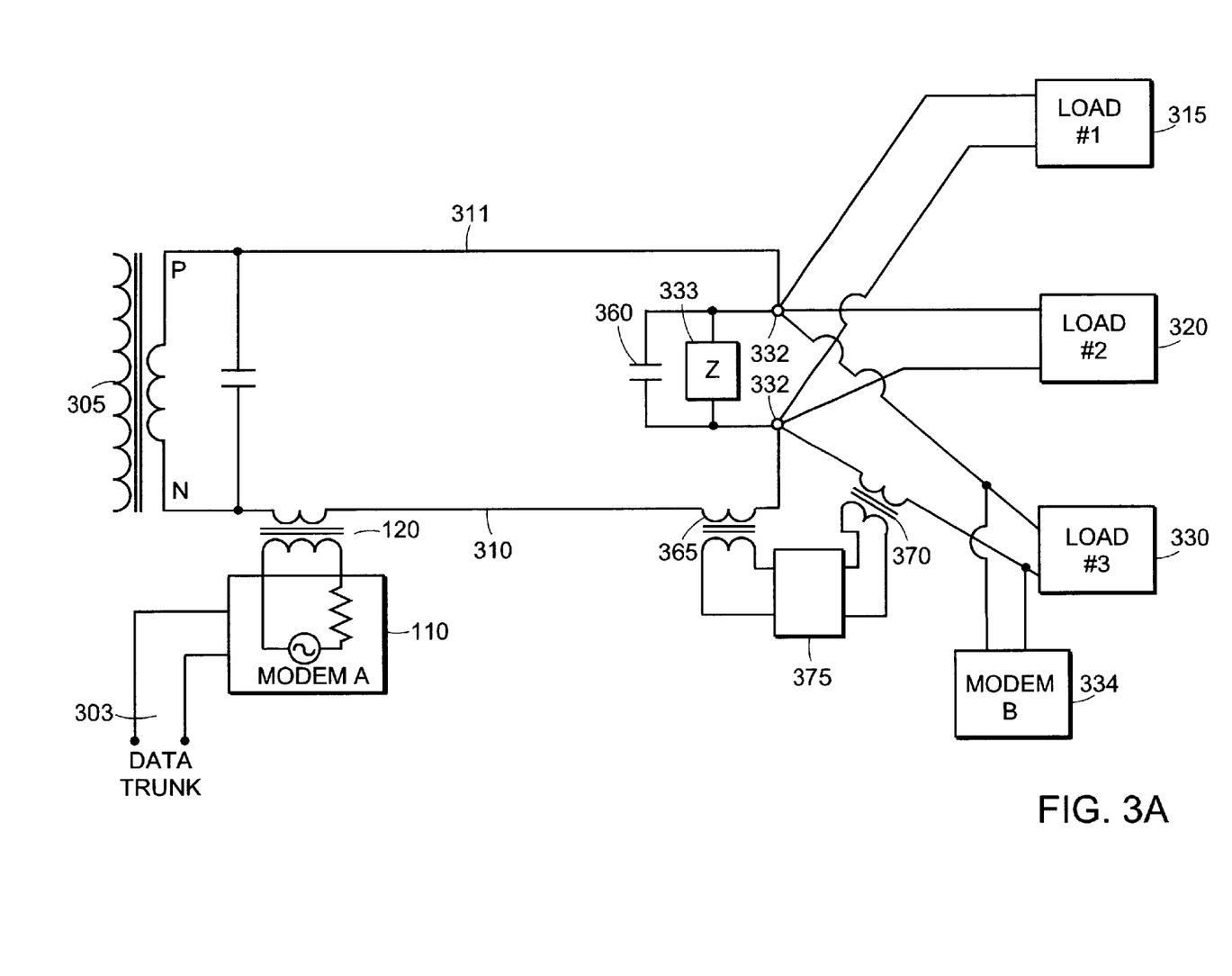
FIGS. 3A and 3B show bypassing of a low impedance node of a power distribution system according to an embodiment of the invention.
Figure 3B:
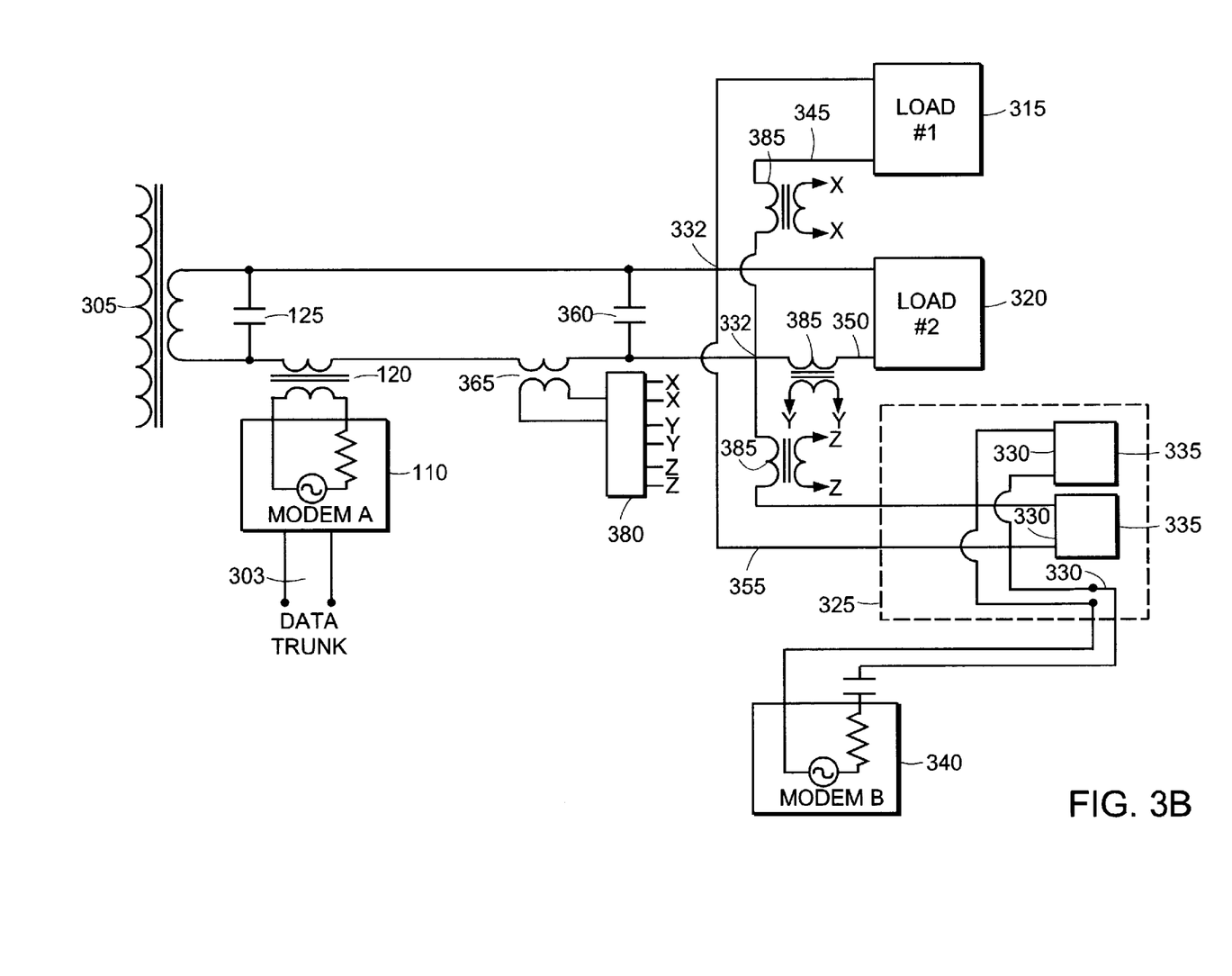

FIGS. 3A and 3B illustrate techniques for bypassing low impedance nodes at both ends of a power transmission line, in accordance with embodiments of the present invention. Examples of such situations include (a) lines run in multi-story buildings from a master power panel to individual floor power panels, (b) lines run from one node to another in a low voltage distribution network, and (c) MV lines run from a transformer substation to a multi-line junction point. FIG. 3A, simplified to a single phase, shows Modem A 110 on a data trunk 303, connected as shown in FIGS. 1E and 1F. Transformer 305 may be an MV-LV or LV-LV distribution transformer.

A node of low impedance may be caused by the manner in which loads are connected to the circuit. For example, across terminals 332, a number of loads 315, 320 and 325 are connected, creating a shunting of impedances and a resultant low drive point impedance across terminals 332. Alternatively, or additionally, a low impedance device 333 might be connected across terminals 332 and represent an impediment to communications with devices 334 downstream.

A low impedance node, such as terminal pair 332, may be bypassed as follows. An RF shorting capacitor 360 is connected across terminal pair 332, so as to ensure its low impedance across the frequency band of interest. The signal is then bypassed around terminals 332 via inductive couplers 365 and 370. Coupler 365 is preferably attached to a neutral wire 310 upstream of capacitor 360, and coupler 370 is attached downstream of terminals 332 and capacitor 360. Because of the low impedance across terminals 332, essentially all of the signal current arriving over neutral wire 310 from modem A 110 flows through coupler 365 and the return path (e.g. wire 311). The low impedance across terminals 332 isolates signals arriving from the left of terminals 332, from signals on the right of terminals 332.

The signal path between couplers 365 and 370 may be (a) a direct connection representing a passive bypass, or (b) an active path that includes an active module 375 such as a bi-directional signal amplifier, a data repeater whose inputs and outputs are in the same frequency band, or a data repeater whose input and output frequency bands are different from each other. If module 375 includes a bi-directional booster amplifier, then to prevent oscillation, the magnitude of attenuation introduced by capacitor 360 should exceed the amplification of module 375.

FIG. 3B illustrates a further enhancement of the arrangement shown in FIG. 3A. Separate downstream couplers 385 are attached to individual lines, each of which feed one or more loads, e.g., loads 315, 320 and 325. Each individual coupler 385 is driven by a separate port XX, YY or ZZ of a booster or repeater, e.g., module 380. The various outputs at ports XX, YY and ZZ may be of identical waveshapes. Alternatively, module 380 may include a router function, to provide separate data streams to each load 315, 320 and 325.

Figure 4:
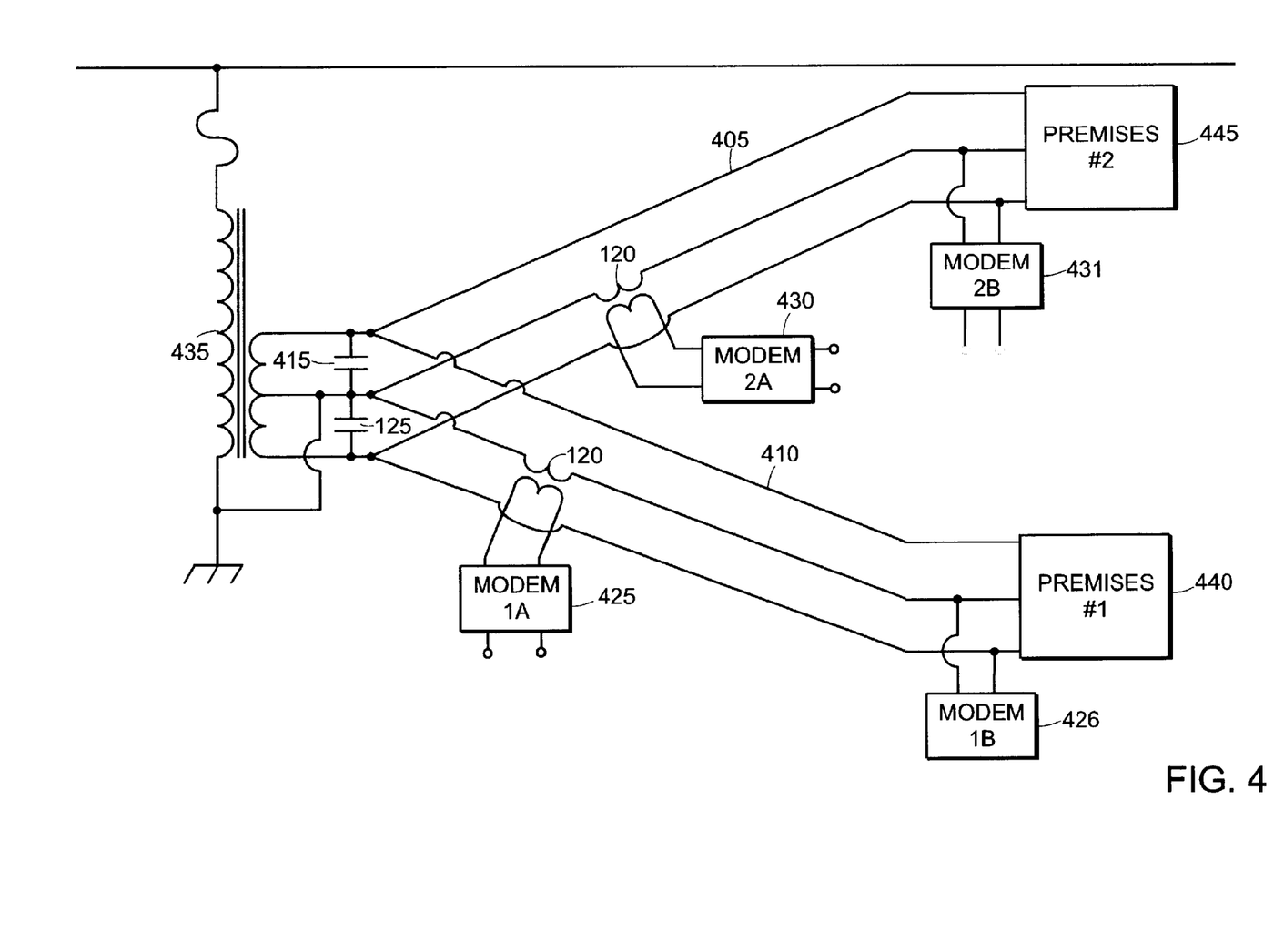
FIG. 4 shows an embodiment for sending separate data streams from a common power line convergence node to different circuits.

FIG. 4 illustrates a technique for sending separate data streams from a common power line convergence node to different circuits. In an MV application, transformer 435 is a high-voltage to medium-voltage (HV-MV) transformer at a substation, and lines 405 and 410 represent feeds to different MV circuits. In an LV application, transformer 435 represents an MV-LV or LV-LV distribution transformer, and lines 405 and 410 represent feeds to different buildings or floors within a building.

Taking the LV distribution application as an example, FIG. 4 is a schematic of multiple premises 440 and 445 fed in a star topology from one DT 435. Often, multiple power cables 405 and 410 are bolted to secondary terminals of DT 435 or split off from a junction node close to DT 435, with each cable routed to feed a separate set of premises 440 and 445. For example, cable 405 is routed to premises 445, and cable 410 is routed to premises 440. Although two cables 405 and 410 are shown in FIG. 4, the star topology may include more than two cables.

An additional benefit of capacitors 125 and 415 is to provide high frequency isolation between the various secondary load circuits fed by cables 405 and 410. This allows each cable 405 and 410 to serve as a separate medium carrying distinct full bandwidth data streams to sets of users in each of the premises 440 and 445. For example, on cable 410, Modem 1A 425 communicates with Modem 1B 426, and on cable 405, Modem 2A 430 communicates with Modem 2B 431.

Figure 5:
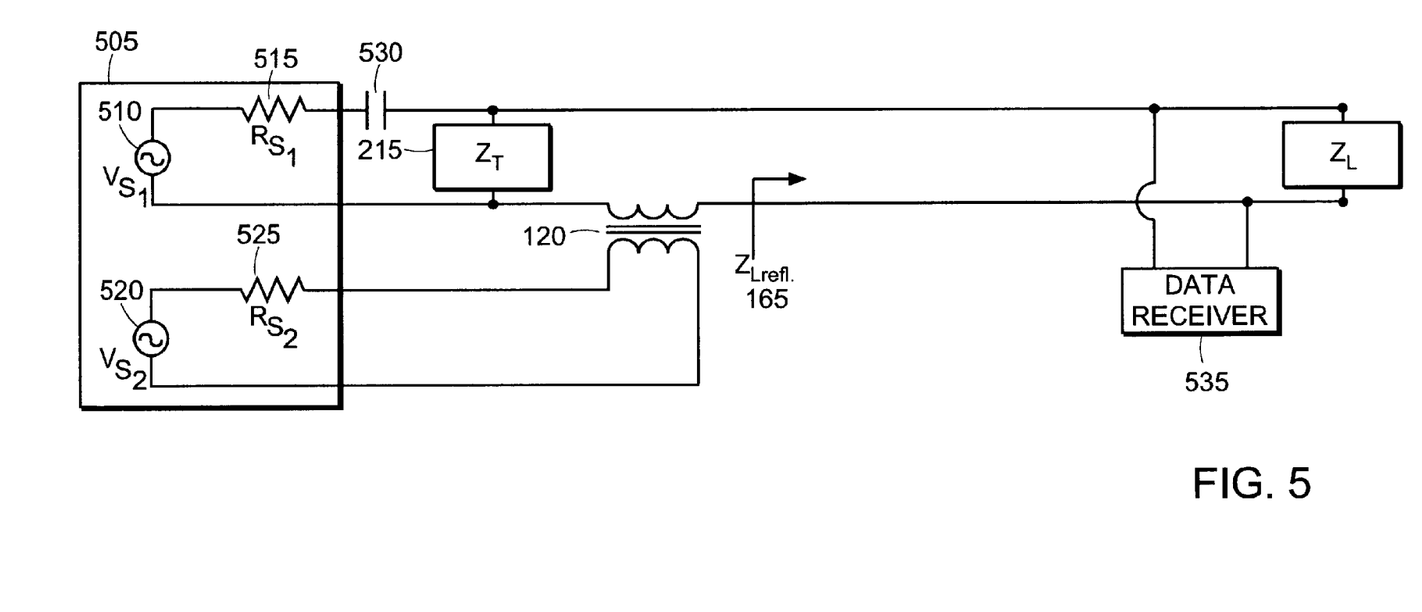
FIG. 5 shows an embodiment overcoming variations in reflected impedance.

FIG. 5 is a schematic of another embodiment of the present invention that overcomes variations in $Z_{Lrefl}$. For simplicity, FIG. 5 shows only one direction of signal flow, the system itself is actually bi-directional. A modem includes a shunt drive from source generator $V_{S1}$ 510 having an internal impedance $R_{S1}$ 515 that couples substantial signal power into the power line in a shunt mode. For frequency ranges over which the reflected load impedance $Z_{Lrefl}$ is relatively high, shunt drive is a very effective mode for transmitting a communications signal. A dual coupling mode modem 505 is equipped with two output circuits that provide signals with identical waveforms, possibly of different amplitudes and/or different impedance levels. The first shunt capacitive output circuit includes generator $V_{S1}$ 510 with its internal impedance $R_{S1}$ 515, and the second series inductance output circuit includes a generator $V_{S2}$ 520 with its internal impedance $R_{S2}$ 525. For example, these output circuits could be two output amplifiers driven from a common signal source.

FIG. 5 shows the first output circuit driving the terminals of a DT secondary impedance 215 in a shunt mode via a coupling capacitor 530. The second output circuit drives a series mode inductive coupler 120 in phase with the first output circuit. The shunt capacitive mode provides an efficient drive for frequency ranges over which impedances $Z_T$ and $Z_{L_{refl}}$ are both relatively high. The series inductance mode is particularly efficient for frequency ranges over which impedance $Z_{L_{refl}}$ is relatively low. The combination of the shunt and series modes provides efficient drive over a large range of impedance combinations.

Figure 6:
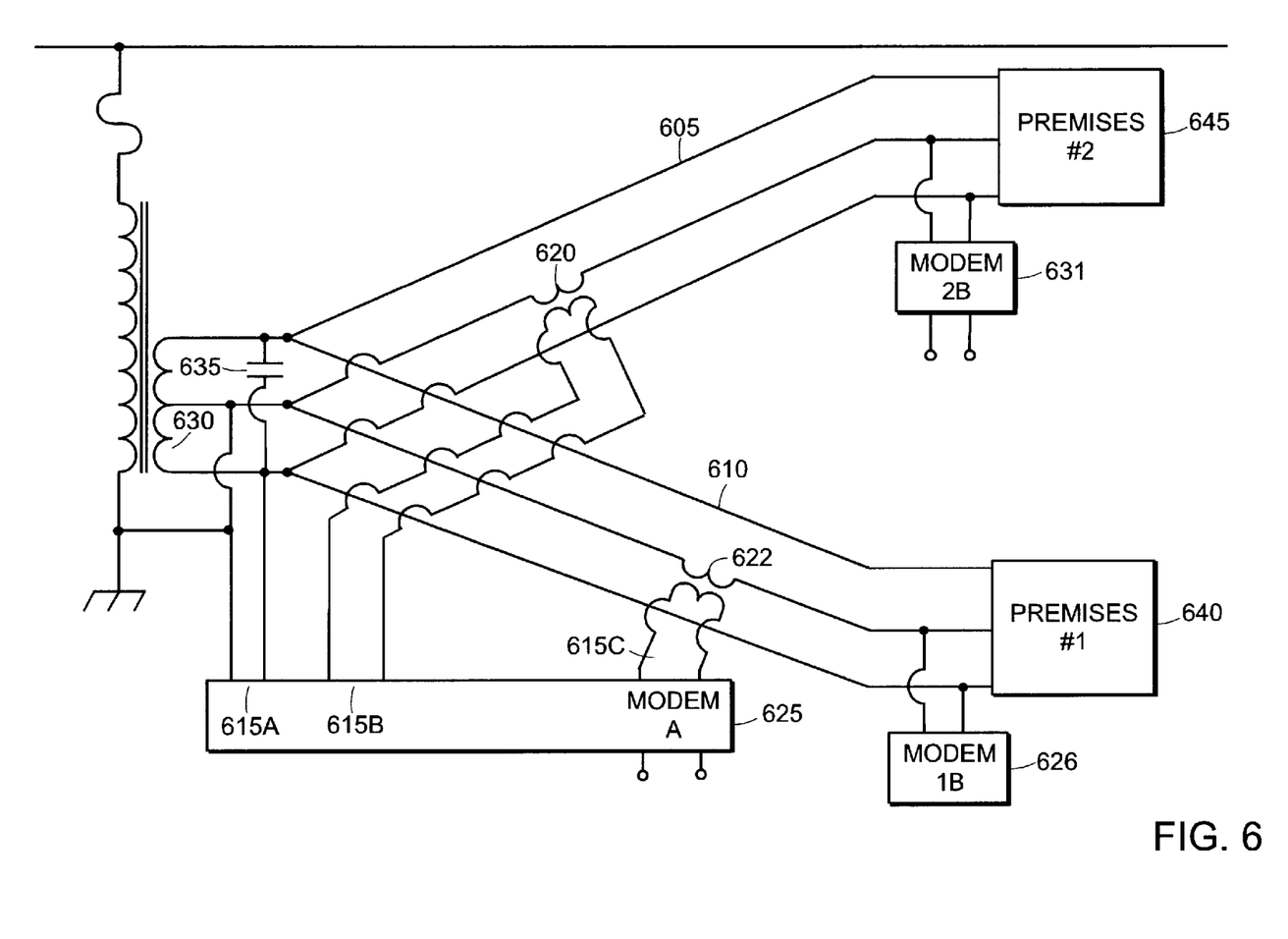
FIG. 6 shows an embodiment using combined shunt and series coupling modes.

FIG. 6 shows another embodiment of the present invention in which combined shunt and series coupling modes are used for the case of multiple secondary power lines 605 and 610. A group of similar insulated lines, for example neutral lines, may be so large in diameter as to preclude attaching a single inductive coupler 120, as shown, for example, in FIG. 1C. Accordingly, multiple couplers 620 and 622 may be attached one to each neutral line and driven by the same waveform from Modem A 625, which is equipped with multiple outputs 615A, 615B and 615C. Output 615A and optional capacitor 635 provide a single shunt drive in common with all low voltage power lines which shorts together the phase lines at modem signal frequencies so that both phase lines may be driven by output 615A. Outputs 615B and 615C each drive a single neutral line in a series mode. Thus, Modem A 625 sends and receives data from all of Modems B 626 and 631. Although FIG. 6 shows a topology having two power lines, any appropriate number of lines may be included.

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for coupling a data signal over a power distribution system, the method comprising:
   installing a series inductive coupler on a transformer secondary line conductor of a power distribution system adjacent to a secondary winding of a distribution transformer; and
   connecting a communication device to the inductive coupler so that a data signal can be coupled between the communication device and the power distribution systems,
   wherein the inductive coupler includes a split magnetic core clamped over the transformer secondary line conductor, and an inductive winding is wound over the core so that a portion of the transformer secondary line conductor within the core couples the data signal.

2. A method according to claim 1, wherein the installing an inductive coupler further places the coupler adjacent to the secondary winding of the distribution transformer within $\frac{1}{10}$ wavelength of a highest used frequency of the data signal.

3. A method according to claim 1, further comprising:
   connecting a capacitor across two terminals of the transformer secondary winding such that the capacitor presents a high impedance to a power signal and a low impedance to a data signal.

4. A method according to claim 1, wherein the transformer secondary line conductor is a neutral conductor.

5. A method according to claim 1, wherein the communication device is a spread-spectrum modem.

6. A data signal system for a coupling a data signal over a power distribution system, the signal system comprising:
   a series inductive coupler installed on a transformer secondary line conductor of a power distribution system adjacent to a distribution transformer; and
   a communication device connected to the inductive coupler so that a data signal can be coupled between the communication device and the power distribution system,
   wherein the inductive coupler includes a split magnetic core clamped over the transformer secondary line conductor, and an inductive winding is wound over the core so that a portion of the transformer secondary line conductor within the core couples the data signal.

7. A signal system according to claim 6, wherein the inductive coupler is installed adjacent to the secondary winding of the distribution transformer within $\frac{1}{10}$ wavelength of a highest used frequency of the data signal.

8. A signal system according to claim 6, further comprising:
   a capacitor across two terminals of the transformer secondary winding such that the capacitor presents a high impedance to a power signal and a low impedance to a data signal.

9. A signal system according to claim 6, wherein the first line conductor is a neutral conductor.

10. A signal system according to claim 6, wherein the communication device is a spread-spectrum modem.

11. A method for coupling a data signal over a power distribution system, the method comprising:
    connecting a series inductive coupler to a first line conductor of a power distribution system, wherein the inductive coupler includes a split magnetic core clamped over the first line conductor;
    connecting a shunt capacitance coupler between the first line conductor and a second line conductor; and
    providing a communication device having parallel first and second interfaces, one interface being connected to the inductive coupler and the other of said first and second interface being connected to the capacitance coupler, to enable coupling of a data signal between the communication device and the power distribution system.

12. A method according to claim 11, wherein the first line conductor is a neutral conductor.

13. A method according to claim 11, wherein the communication device is a spread-spectrum modem.

14. A method according to claim 11, wherein the distribution system includes a distribution transformer and the inductive coupler is connected adjacent to a secondary winding of the transformer within $\frac{1}{10}$ wavelength of a highest used frequency of the data signal.

15. A data signal system for coupling a data signal over a power distribution system, the signal system comprising:
    a series inductive coupler connected to a first line conductor of a power distribution system, wherein the inductive coupler includes a split magnetic core clamped over the first line conductor;
    a shunt capacitive coupler connected between the first line conductor and a second line conductor; and a communication device having parallel first and second interfaces, the first interface being connected to one coupler and the second interface being connected to the other coupler, to enable coupling of a data signal between the communication device and the power distribution system.

16. A signal system according to claim 15, wherein the first line conductor is a neutral conductor.

17. A signal system according to claim 15, wherein the communication device is a spread-spectrum modem.

18. A signal system according to claim 15, wherein the distribution system includes a distribution transformer and the inductive coupler is connected adjacent to a secondary winding of the transformer within 1/10 wavelength of a highest used frequency of the data signal.

19. A method for coupling a data signal across a low impedance node of a power distribution system, the method comprising:

connecting a capacitor in parallel with a low impedance node of a power distribution system, the capacitor presenting a high impedance to a power signal and a low impedance to a data signal;

connecting a first inductive coupler in series with a line conductor, upstream of the node;

connecting a second inductive coupler in series with the line conductor, downstream of the node; and operatively connecting the first inductive coupler and the second inductive coupler to couple the data signal across the node.

20. A method according to claim 19, wherein operatively connecting includes connecting a signal amplifier between the first inductive coupler and the second inductive coupler.

21. A method according to claim 19, wherein operatively connecting includes connecting a data router between the first inductive coupler and the second inductive coupler for selectively routing a data signal between the first inductive coupler and the second inductive coupler.

22. A method according to claim 19, wherein the second inductive coupler is one of a plurality of inductive couplers downstream of the node, and wherein the data router selectively routes data signals between the first inductive coupler and the plurality of inductive couplers.

23. A data signal system for coupling a data signal across a low impedance node of a power distribution system, the signal system comprising:

a capacitor connected in parallel with a low impedance node of a power distribution system, and presenting a high impedance to a power signal and a low impedance to a data signal;

a first inductive coupler connected in series with a line conductor, upstream of the node; and a second inductive coupler connected in series with the line conductor, downstream of the node, wherein the first inductive coupler and the second inductive coupler are operably connected to couple the data signal across the node.

24. A data signal system according to claim 23, further comprising a signal amplifier that operably connects the first inductive coupler and the second inductive coupler.

25. A data signal system according to claim 23, further comprising a data router that operably connects the first inductive coupler and the second inductive coupler to selectively route a data signal between the first inductive coupler and the second inductive coupler.

26. A data signal system according to claim 23, wherein the second inductive coupler is one of a plurality of inductive couplers downstream of the node, and wherein the data router selectively routes data signals between the first inductive coupler and the plurality of inductive couplers.

* * * * *